United States Patent
Sato et al.

(10) Patent No.: US 7,918,722 B2
(45) Date of Patent: Apr. 5, 2011

(54) IMAGE PROCESSING DEVICE, IMAGE PROCESSING METHOD AND STORAGE MEDIUM FOR STORING PROGRAMS FOR EXECUTING IMAGE PROCESS CYCLES

(75) Inventors: Tomonori Sato, Tokyo (JP); Daichi Katagiri, Tokyo (JP); Yasuo Kawagoshi, Tokyo (JP); Makoto Sato, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 733 days.

(21) Appl. No.: 11/285,155

(22) Filed: Nov. 23, 2005

(65) Prior Publication Data
US 2006/0135236 A1 Jun. 22, 2006

(30) Foreign Application Priority Data
Nov. 26, 2004 (JP) .................. 2004-342982

(51) Int. Cl.
*A63F 13/00* (2006.01)
(52) U.S. Cl. .............................. 463/6; 463/31
(58) Field of Classification Search ............... 463/6, 31; 434/69; 700/92
See application file for complete search history.

(56) References Cited

U.S. PATENT DOCUMENTS

| | | | |
|---|---|---|---|
| 6,755,654 B2 * | 6/2004 | Hightower | 434/69 |
| 2003/0190951 A1 * | 10/2003 | Matsumoto | 463/30 |
| 2005/0277455 A1 * | 12/2005 | Chudley et al. | 463/6 |

FOREIGN PATENT DOCUMENTS

| | | |
|---|---|---|
| EP | 1 479 422 | 11/2004 |
| JP | 2000-153069 | 6/2000 |
| JP | 2005-058383 | 3/2005 |
| WO | WO 01/05475 | 1/2001 |

OTHER PUBLICATIONS http://www.answers.com/topic/outrun-2.*
http://www.ntsc-uk.com/review.php?platform=arc&game=Outrun2
http://www.1up.com/do/previewPage?cId=3115019&p=10.*
European Search Report for EP 05257244.
XP 002373042: http://www.gamefaqs.com/coinop/arcade/data/924982.html (Oct. 15, 2004).
XP 002373043: http://db.gamefaqs.com/coinop/arcade/file/outrun2_sp.txt (Oct. 5, 2004).
"Outrun-2," SEGA Corporation webpage, http://am.sega.jp/utop/closeup/outrun2_02.html, retrieved Sep. 11, 2008, game released 2003.

* cited by examiner

*Primary Examiner* — James S. McClellan
(74) *Attorney, Agent, or Firm* — Finnegan, Henderson, Farabow, Garrett & Dunner, L.L.P.

(57) ABSTRACT

Travel historical data corresponding with each course are pre-prepared in accordance with the course type of the branch-point transition at the branching point. The course selected by the operator is discriminated in real time in the area of the branching point, either set of travel historical data is read, and the travel historical data is made to continue on from the previous travel historical data, whereby the ghost car image is displayed. Therefore, the ghost car image can always be made to travel together with the player moving body in accordance with the course arbitrarily selected by the operator.

6 Claims, 8 Drawing Sheets

○ : BRANCHING POINT
▽ : CHECK POINT

FIG.8B

IMAGE PROCESSING DEVICE, IMAGE PROCESSING METHOD AND STORAGE MEDIUM FOR STORING PROGRAMS FOR EXECUTING IMAGE PROCESS CYCLES

BACKGROUND

The present invention relates to an image processing technology, and more particularly, to an image processing technology that is applied to vehicle racing games of video game devices.

Conventionally, application programs of home game devices include games that perform races by using vehicles (four-wheeled vehicles and two-wheeled vehicles and so forth).

In racing games of this type, opponents exist and compete with one another over the travel time from a starting point to a goal point as a result of a plurality of different racers manipulating the speed and steering of each of a plurality of vehicles.

Here, the proposal is such that a circumferential course is established as the course layout and, when an evaluation of the state of completion of the game is performed by means of the total time when vehicles in a game program go around the course a plurality of times, as a criterion for judging the extent of the difference between the lap time of each circuit and the fastest lap time based on the previous history, trail images (ghost cars) based on the history are made to travel together on the course with the vehicles (See Japanese Patent Application Laid-Open No. 2000-153069).

Further, in Japanese Patent Application Laid-Open No. 2000-1530696, the fact that it is sometimes not possible for a moving body that is actually moving to travel together with ghost cars on the same screen as a result of the time difference between the moving body and the ghost cars is presented as a problem and, in order to solve this problem, an excessive widening of the gap between the actual moving body and the ghost cars is suppressed by updating the trail image in circuit units and regenerating the display of the trail image, for example.

However, because the course layout is basically a circumferential course in Japanese Patent Application Laid-Open No. 2000-153069, when the previous history is selected, data for the fastest speed, and so forth, for example, can be unmistakably established. However, in cases where there is a branching point in the course layout, when the course through which the operator is actually moving through real-time manipulation and the movement courses of the selected history are different, the ghost cars are not able to travel together beyond the branching point.

Although, for race sections, division into circuit units, and division into linear sections and curved sections are mentioned in Japanese Patent Application Laid-Open No. 2000-153069, the course layout itself is a circumferential course and, if selected parameters (history of fastest speed and so forth) are selected for each race section, because trail images (ghost cars) are unmistakably established, course movement rendered through actual manipulation by the operator is not considered and not a concept.

SUMMARY

The present invention considers the above situation and an object of the present invention is to provide an image processing device and image processing method which even when, upon manipulating the movement of a moving body, at least a branching point exists in a standard course layout and an operator arbitrarily selects a fork direction in real-time, make it possible for an imaginary moving body to always travel together on the same display screen in the selected fork direction.

In order to achieve the above object, the present invention is an image processing device that executes a program that generates a course with fork roads in a virtual space and causes a player moving body that is manipulated by a player to travel on the course together with an imaginary moving body that is manipulated by a data processing unit with respect to the player moving body, comprising: a processing unit that executes the program on the basis of an operation signal from operation means; and a memory for storing the program, wherein the processing unit is constituted to execute means for detecting the next fork road of the present course along which the player moving body is moving; means for establishing the imaginary moving body in a quantity in accordance with the number of the fork roads; and means for causing the established imaginary moving body and the player moving body to travel together on the present course.

According to the present invention, when a player moving body reaches fork roads, an imaginary moving body is able to travel together with the player moving body when the player moving body is to move along a particular fork road by causing the imaginary moving body to move to respective fork roads.

In the case of the present invention, the processing unit is constituted to establish the imaginary moving body in a quantity corresponding to the number of the fork roads. The imaginary moving body is controlled by the processing unit independently of the operation data from the operating means. The processing unit stores in the memory previous historical data of the player moving body between respective fork roads from a certain fork road to the next fork road in the course, and establishes movement characteristics of the imaginary moving body on the basis of the historical data.

Further the present invention is an image processing method that causes a processing unit to execute a program that generates a course with fork roads in a virtual space and causes a player moving body that is manipulated by a player to travel on the course together with an imaginary moving body with respect to the player moving body, wherein the processing unit executes a processing step of executing the program on the basis of an operation signal from operating means; and the processing step comprises the steps of detecting the fork roads that follow the preceding fork roads of the present course along which the player moving body is moving; establishing the imaginary moving body in a quantity in accordance with the number of fork roads; and causing the established imaginary moving body and the player moving body to travel together on the present course. In addition, the present invention is also a storage medium for storing a program for causing a computer to execute each of the aforesaid means.

A further aspect of the present invention is a storage medium that stores a game program that causes a computer to operate as a game system that causes the emergence, in a movement course having a race section that is established in a game space and constituted to split into a plurality of paths at a predetermined branching point, of a player moving body that moves along the race section as a result of manipulation by a player, and of a reproduced moving body constituting an opponent of the player moving body in the race section, and which game system displays an image in which the player moving body and reproduced moving body move along the race section as a game screen, wherein reproduction data for causing the emergence of the reproduced moving body is stored in storage means in correspondence with sections from a starting point of the race section to an end point of the race section that is established for each of the plurality of paths via the branching point, the game program comprising processing to judge whether the player moving body has reached the starting point of the race section, processing which, when the player moving body has reached the starting point of the race section, reads a plurality of reproduction data stored in correspondence with a plurality of paths that are established in the race section from the storage means; processing that causes the emergence at the starting point of the race section of a plurality of reproduced moving bodies based on the reproduction data, processing to cause the reproduced moving bodies to move in the race section based on the reproduction data; and processing which, when the reproduced moving bodies have reached the end point of the race section, ends the movement processing of the reproduced moving bodies.

In addition, a further aspect is a storage medium that stores a game program, further comprising processing in which the reproduction data includes game results data for the reproduction moving body in the race section and in which, while the player moving body is moving along the race section, sequentially stores the movement historical data (position and speed) and game results data for the player moving body in the race section, and processing which, after the player moving body has reached the end point of the race section, compares the game results data of the reproduction data of the race section and the game results data of the player moving body and, when the game results data of the player moving body reflects a win of the game results data of the player moving body over the game results data of the reproduction data, substitutes the movement historical data of the player moving body and the game results data with the reproduction data and stores same.

As described above, the present invention affords the following effect. Even when, upon manipulating the movement of the moving bodies, at least a branching point exists in a standard course layout and the operator arbitrarily selects a fork direction in real-time, it is possible to cause imaginary moving bodies to always travel together on the same display screen in the selected fork direction.

DETAILED DESCRIPTION

Figure 1:
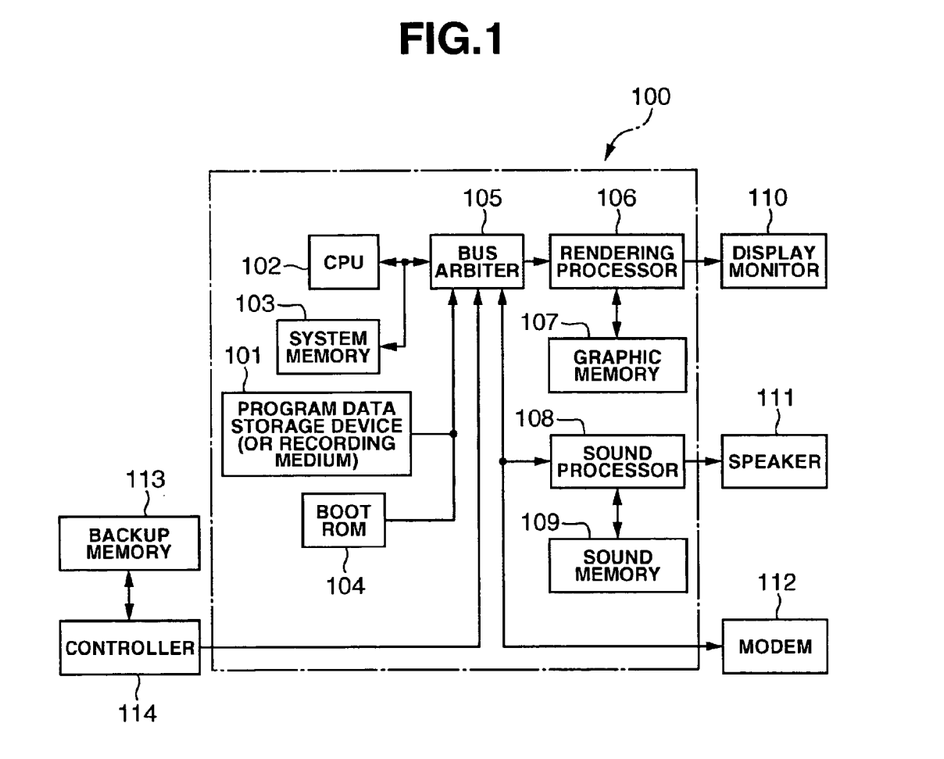
FIG. 1 is a block diagram of a game device to which the present invention is applied.

FIG. 1 is a block diagram of a game device that constitutes an example of the image processing device according to the present invention.

A game device 100 comprises a program data storage device or storage medium (includes an optical disk and optical disk drive or the like) for storing a game program and data and so forth (also includes pictures and music data), a CPU 102 constituting one example of the processing unit that executes the game program, controls the whole system, and performs coordinate calculations for the image display, a system memory 103 that stores programs and data required by the CPU 102 to perform processing, a BOOTROM 104 for storing programs and data required when starting up the game device 100 and a bus arbiter 105 for controlling the flow of the programs and data and so forth of each block of the game device 100 and devices connected to the outside, the foregoing components each being connected to a bus.

A rendering processor 106 is connected to the bus and an image that is to be generated in accordance with picture (movie) data read from the program data storage device or a storage medium 101 and in accordance with manipulation by the operator and game progress is displayed on a display monitor 110 by the rendering processor 106.

Graphics data and so forth required by the rendering processor 106 to perform image generation are stored in a graphics memory (frame buffer) 107.

A sound processor 108 is connected to the bus and effect sounds and speech and so forth that are to be generated in accordance with music data that is read from the program data storage device or storage medium 101 and in accordance with manipulation by the operator and the progress of the game are outputted from a speaker 111 by the sound processor 108.

Sound data and so forth required by the sound processor 108 to generate effect sounds and speech and so forth are stored in a sound memory 109.

A modem 112 is connected to a game device 100 and communications with another game device 100 and a network server and so forth can be performed via a telephone line (not shown).

In addition, a backup memory 113 (also including a disk storage medium and storage device and so forth) that stores information and so forth as the game elapses as well as program data that are inputted and outputted via a modem and a controller 114 that inputs information for controlling the game device 100 and devices that are connected to the outside in accordance with manipulation by the operator to the game device 100 are connected to the game device 100. An image computation processing unit is constituted by the CPU 102 and rendering processor 106.

In this embodiment, a vehicle movement simulation game program is stored as program data and the game device 100 starts up the rendering processor 106 and sound processor 108 and so forth which are to execute the vehicle movement simulation game. The vehicles in the vehicle movement simulation game correspond to the moving bodies of the present invention.

Figure 2:
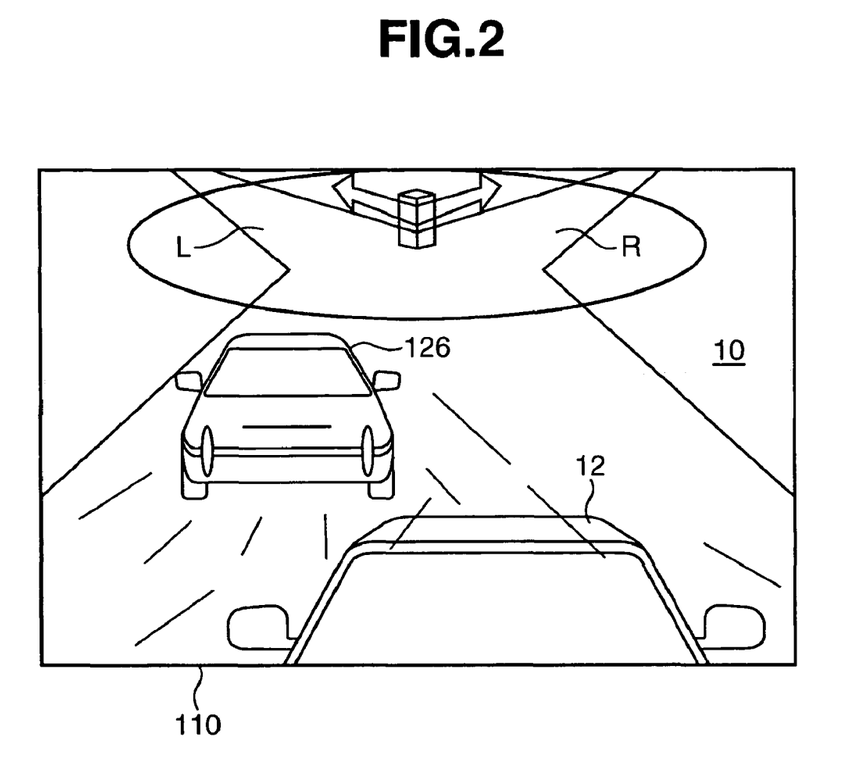
FIG. 2 is a front view showing part of a vehicle travel simulation game image that is displayed on a display monitor according to this embodiment.

The display monitor 110 displays a background image 10 as shown in FIG. 2 and a vehicle image 12 constituting a moving body that is superposed on the background image 10 based on the vehicle movement simulation game program. The background image 10 and vehicle image 12 are images from a virtual viewpoint established in a three-dimensional virtual space and suitably constitute a display with a certain perspective of a so-called bird's eye view format. For example, an aspect in which moving bodies move in competition with one another along a course layout 14 shown in FIG. 3 is displayed along with the background image 10.

Figure 3:
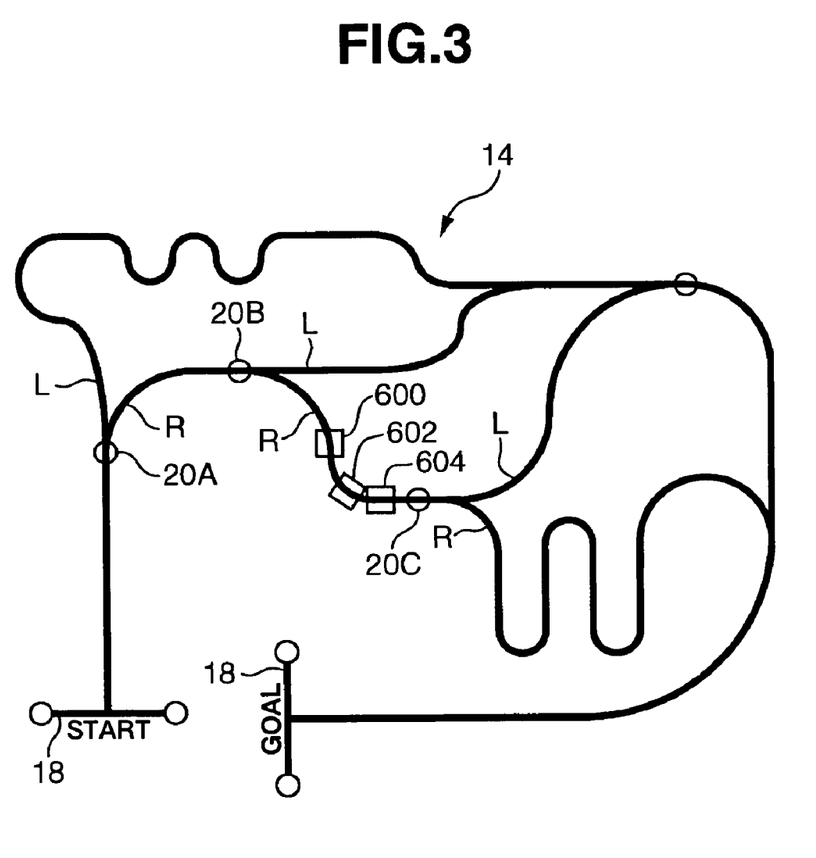
FIG. 3 is a course layout diagram that is established for the vehicle travel simulation game according to this embodiment.

Here, as shown in FIG. 3, the course layout includes a starting point 16 and a goal point 18 between which a plurality of branching points (branching points 20A, 20B, and 20C in three locations in this embodiment, which appear as 'branching points 20' when a general term is used hereinbelow) exist.

Any of the branching points 20 is selected by the operator by means of a steering operation and the vehicle operated by the player (600 in FIG. 3) moves along the selected course. The players compete over the time taken to move from the starting point 16 to the goal point 18. A picture from a virtual viewpoint overlooking the vehicle image 12 operated by the player is displayed on the display monitor 110 (FIG. 2).

Further, as a further game method, a time trial from the starting point 16 to the goal point 18 can be executed by displaying one vehicle image 12 and as a result of one operator manipulating the speed and steering and so forth (time trial game).

In addition to the player moving body (actual moving body) 600 that is manipulated by the player, ghost cars 602 and 604 constituting imaginary moving bodies that are manipulated by the computer are made to appear in the course layout. Ghost cars are displayed as 12G in FIG. 2 and, in many cases, the front of a player moving body 12 moves over the course as if guiding the player moving body. The ghost cars are a commonly known technology and fastest-speed data are selected as the travel characteristic of the ghost cars from among travel historical data on the player moving bodies executed thus far. Recognition of a ghost car is such that, in FIG. 2, in order to discriminate the real vehicle image 12 and the ghost car image 12G, the transparency of the ghost car image 12G is approximately 50% (perspective display). As a result, the ghost car image 12G is half-transparent and the background image 10 may be seen therethrough, whereby the player is able to view the ghost car image 12G as an imaginary vehicle.

Further, as shown in FIG. 3, a plurality of branching points 20 exist in the course layout of this embodiment. At these branching points 20, because the subsequent (following the branching points 20) course is decided through the manipulation of the operator that has been operating the player moving body immediately before, there are cases where the course over which the ghost car image 12G of the commonly known technology travels and the course that the operator actually selects at the branching point 20 are different.

Therefore, when the player moving body has reached the section to the next fork after the fork, ghost cars corresponding to the number of subsequent branching points are made to travel together with the player moving body. To explain this in view of FIG. 3, when the player moving body 600 is on the course between the branching point 20B and branching point 20C, the number of forks of the course at branching point 20C is two forks, namely L and R. Therefore, two ghost cars 602 and 604 travel together with the player moving body 600 between the branching points 20B and 20C. The ghost car 602 travels along the fork road L and the ghost car 604 travels along the fork road R. Thus, irrespective of whether the player moving body 600 travels along L or R, a ghost car compulsorily travels together with the player moving body.

The ghost car characteristics are determined for each of the courses between forks. The ghost car with the fastest speed is selected as the parameter of the ghost car from previous travel data on the player moving body for each course between forks. When a plurality of ghost cars is made to appear on the course between forks, the parameter is established for each of the ghost cars. A predetermined difference in distance between the ghost cars is established so that a plurality of ghost cars does not overlap one another.

The relationship between the coordinates on the course and the number of fork roads on the subsequent fork roads is stored in the form of a table and the processing unit references the table on the basis of the travel position of the player moving body to determine the number of ghost cars traveling on the course. When this is described on the basis of FIG. 3, two ghost cars 602 and 604 are established by referencing the set values of the table between branching point 20B and branching point 20C. The number of ghost cars that are made to appear on the route before the fork road is determined in accordance with the number of forks and is set at a number equal to or more than the number of forks.

Figure 4:
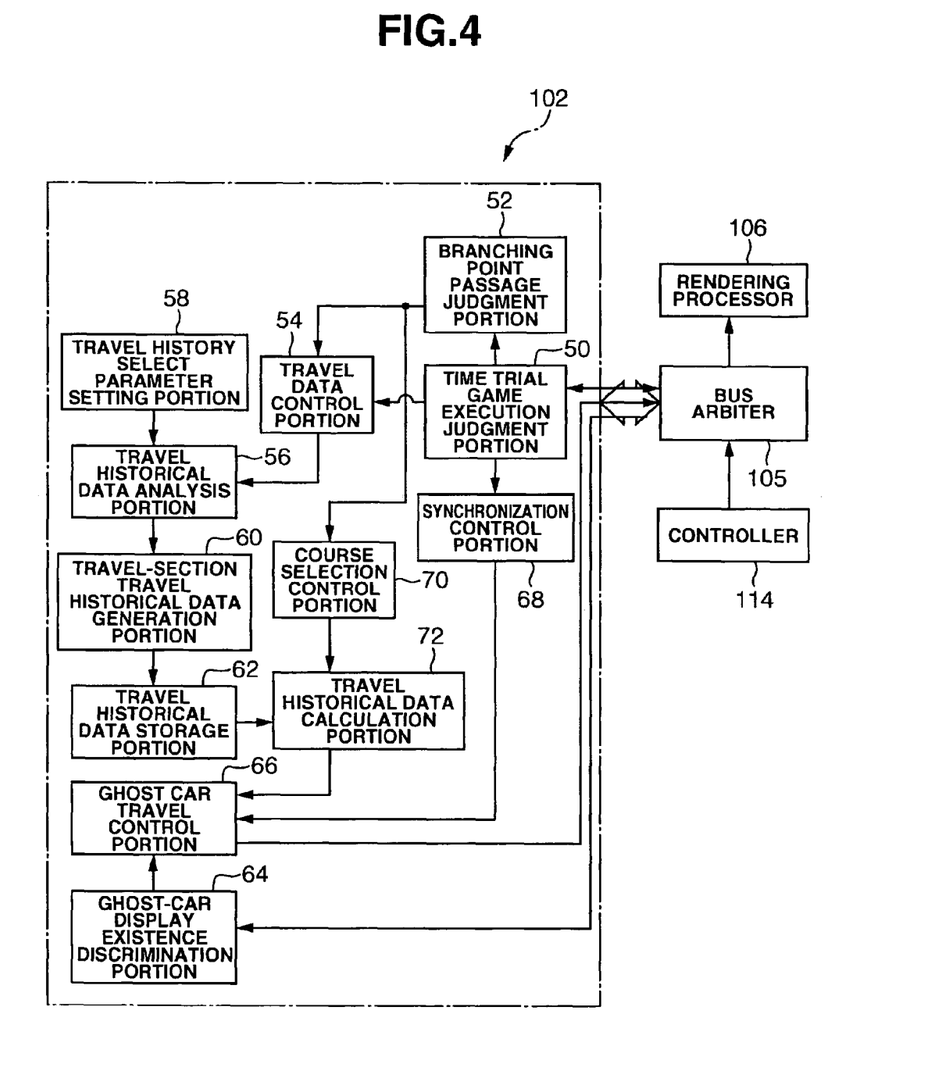
FIG. 4 is a functional block diagram that is created by functionally classifying control for controlling the selection of travel historical data of the CPU that controls the flow of the game.

FIG. 4 is a functional block diagram that is created by functionally classifying control of the selection of travel historical data of the CPU 102 that controls the flow of the game. Each block of the functional block diagram schematically shows the control aspect of the CPU 102.

A game execution control portion 50 is connected to the bus arbiter 105. In the game execution control portion 50, the execution of the racing game is controlled on the basis of the manipulation of the controller 114.

Figure 5:
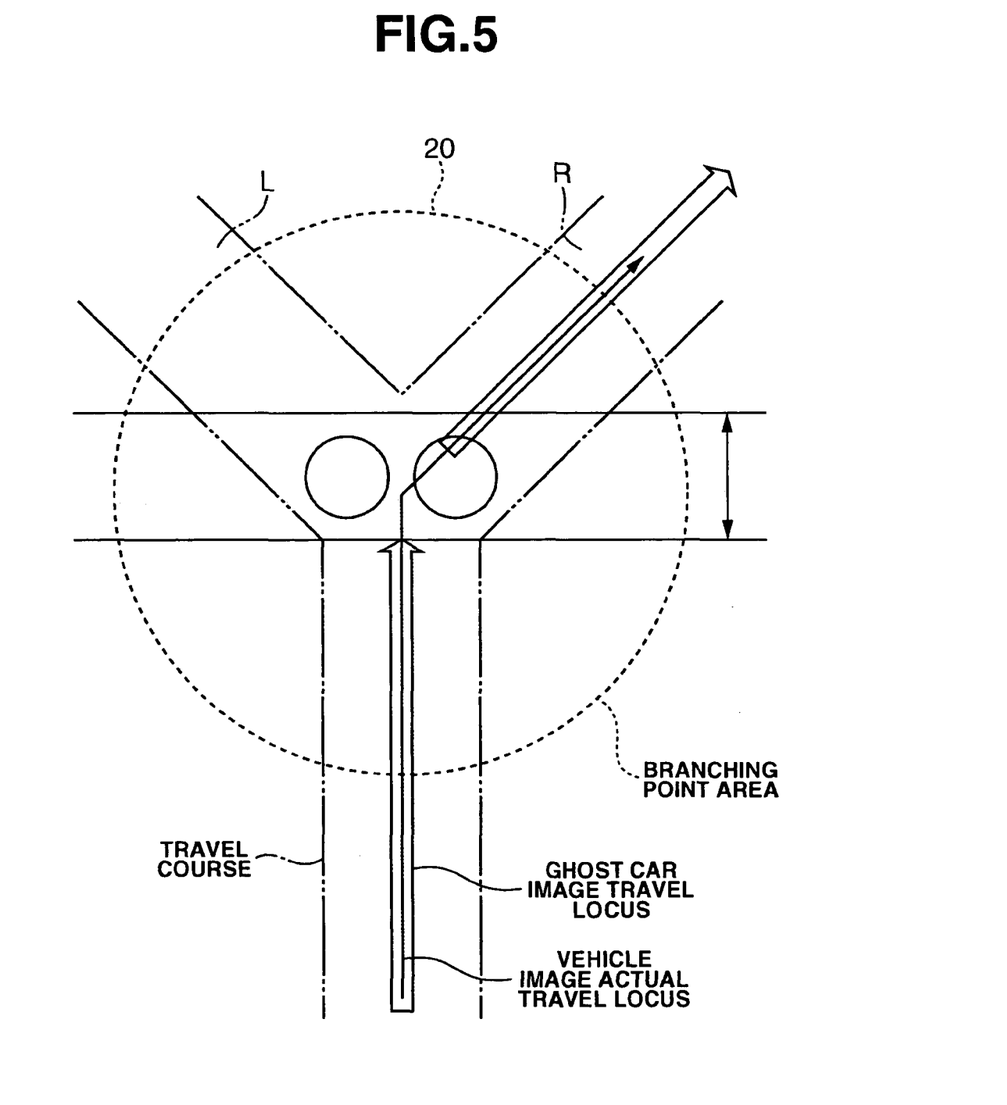
FIG. 5 is a planar view of a branching point that schematically shows the selection of travel historical data at the branching point.

During the control of the execution of the racing game execution control portion 50, a branching point passage judgment portion 52 judges whether the vehicle image 12 has reached the branching points 20 (See circles in FIGS. 2, 3 and 5). Further, the game execution control portion 50 is connected to a travel data accumulation portion 54. The travel data accumulation portion 54 receives and accumulates actual travel data under the execution control of the game execution control portion 50.

The branching point passage judgment portion 52 is connected to the travel data accumulation portion 54 and is capable of classifying travel data that is received from the game execution control portion 50 for each branching point.

The travel data accumulation portion 54 is connected to a travel historical data analysis portion 56. The travel historical data analysis portion 56 analyzes the travel data accumulated for each single game in the travel data accumulation portion 54 on the basis of a parameter that is designated by a travel history selection parameter designation portion 58.

In this embodiment, the selection parameter is 'fastest speed'. Respective fastest-speed travel data are extracted from the travel data for each range classified by branching points inputted to the travel historical data analysis portion 56 and a travel-section travel historical data generation portion 60 generates travel historical data for each travel section.

The travel-section travel historical data generation portion 60 is connected to a travel historical data storage portion 62. The travel historical data storage portion 62 updates and stores the travel-section travel historical data thus generated.

Here, when a time trial game (a contest in which opponents compete over the time taken to travel over a course) is executed through manipulation of the controller 114, upon designation of combined travel with the ghost car images 12G, the designation signal is sent to a ghost-car display existence discrimination portion 64 via the bus arbiter 105.

When a combined travel instruction (the existence of a ghost car image display) is discriminated by the ghost-car display existence discrimination portion 64, a ghost car display control portion 66 is started up. Here, the ghost car display control portion 66 is connected to the time trial game execution control portion 50 via a synchronization control portion 68.

Meanwhile, the branching point passage judgment portion 52 is connected to a course selection discrimination portion 70 and course selection with branching point 20 is discriminated based on the operator's manipulation of the controller 114 during the progress of the game in the time trial game execution control portion 50 and discriminated course selection information is sent to a travel historical data read portion

72. The travel historical data read portion 72 reads travel historical data from the travel historical data storage portion 62 for each branch point 20 and sends the travel historical data to the ghost car travel control portion 66.

That is, the ghost car travel control portion 66 displays the ghost car image 12G on the basis of the travel historical data read by the travel historical data read portion 72. However, here, the travel historical data for each course L (or R) that branches off at the branching point 20 and beyond is stored in the travel historical data storage portion 62. Therefore, if the travel historical data is chosen on the basis of the course selection discriminated by the course selection discrimination portion 70, the ghost car image 12G can be displayed in real time in accordance with arbitrary course selection by the operator.

The action of this embodiment will be described hereinbelow with reference to the flowcharts in FIGS. 6 and 7.

Figure 6:
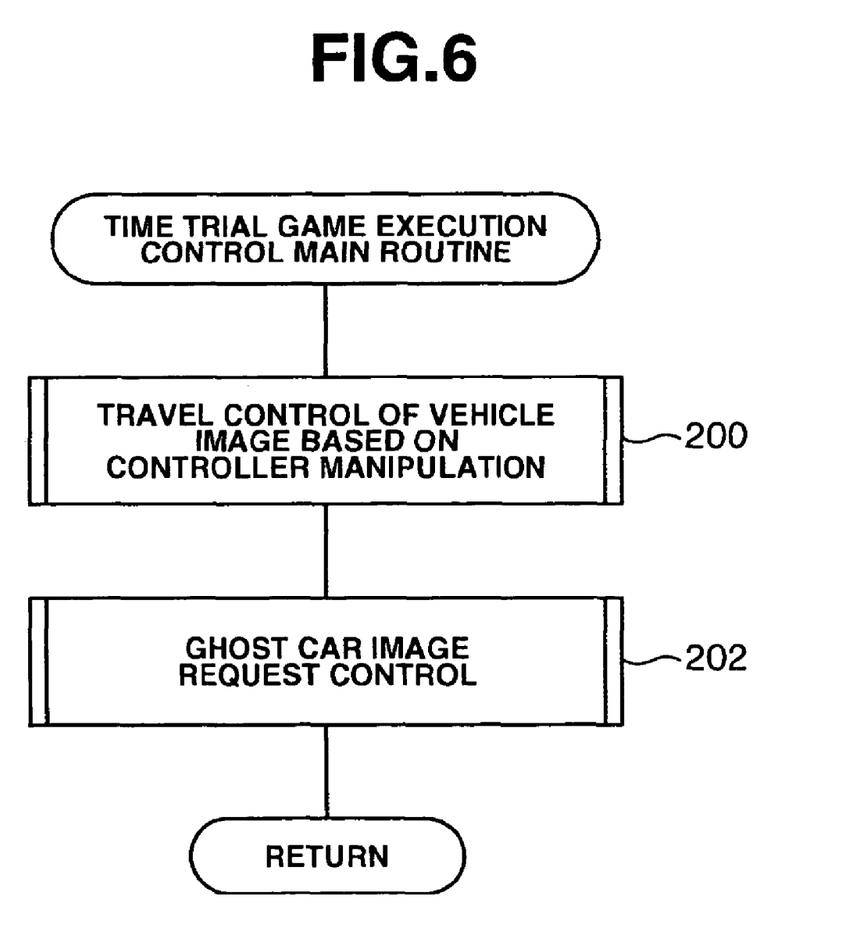
FIG. 6 is a flowchart showing a time trial game execution control main routine according to this embodiment.

FIG. 6 shows the main routine of execution control of the time trial game. When the time trial game is selected by the controller 114, travel control of the vehicle image 12 is executed on the basis of manipulation of the controller 114 in step 200, whereupon ghost car image display control is executed in step 202. As a result of the main routine being processed in several msec, when the ghost car image display is selected, the vehicle image travel control and ghost car travel control are controlled using time division so that the vehicle image and ghost car travel apparently simultaneously.

Figure 7:
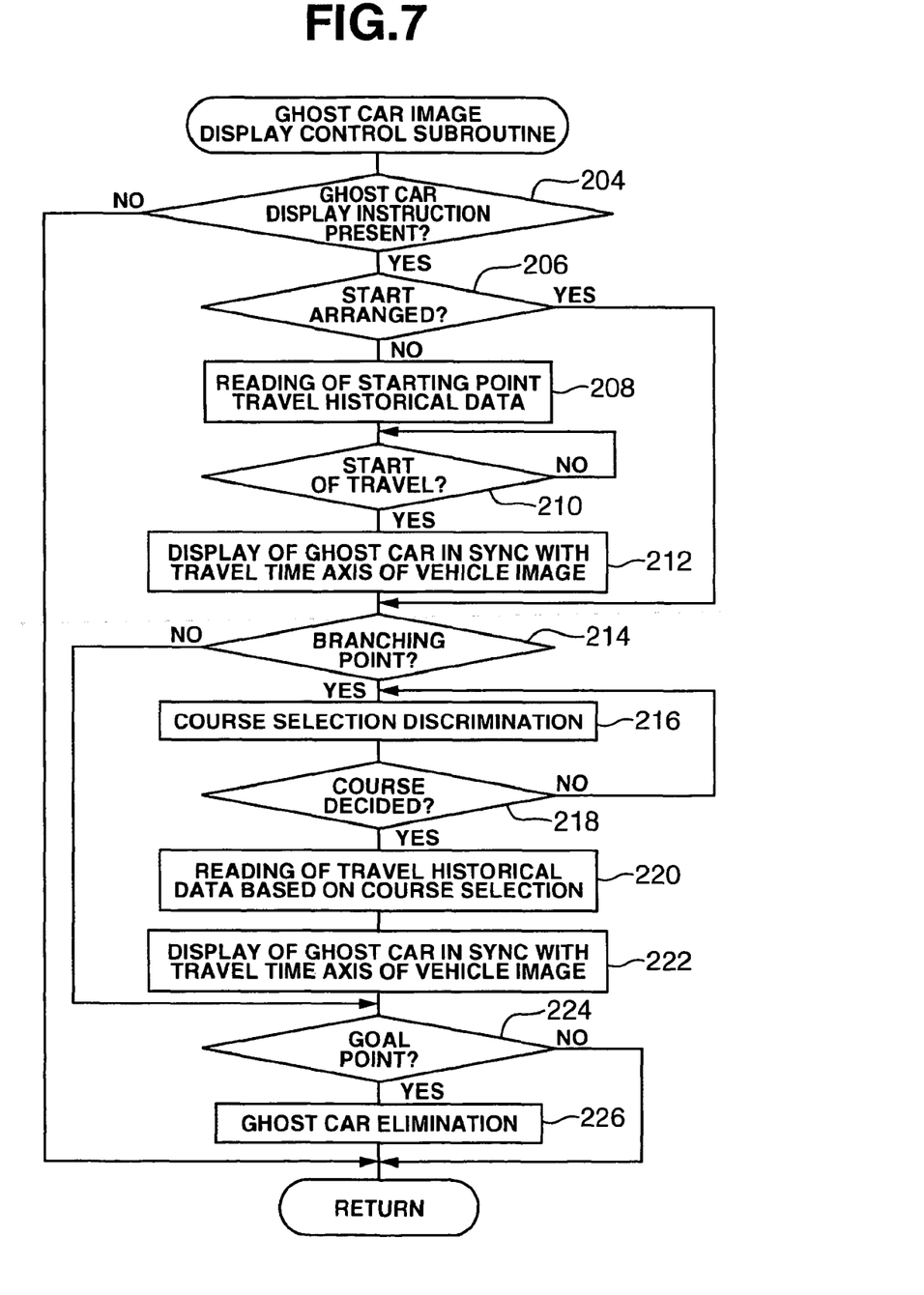
FIG. 7 is a flowchart showing the details of the ghost car image display control subroutine in FIG. 6.

FIG. 7 shows details of the ghost car image display control in step 202 in FIG. 6.

First, when it is judged whether there is a display instruction for the ghost car image 12G in step 204 and a negative judgment is yielded, the subsequent routine is not executed and ends.

Further, when an affirmative judgment is yielded in step 204, processing moves to step 206 and it is judged whether the start is arranged. When an affirmative judgment is yielded in step 206, it is judged that the start will then take place, whereupon processing moves to step 208 and travel historical data for the starting point 16 is read. The processing then moves on to step 210 and it is judged whether travel has started. Standby until travel starts is then executed. When an affirmative judgment is yielded in step 210, the processing moves to step 212 and the display of the ghost car image 12G in sync with the travel time axis of the vehicle image 12 is executed and the processing moves to step 214. As described earlier, the number of subsequent forks on the course is detected and it is established that ghost cars corresponding with the number of forks (may exceed the number of forks) are traveling on the course.

Further, the processing also moves to step 214 when a negative judgment is yielded in step 206, that is, that the start is already arranged.

When it is judged whether a branching point 20 (circles shown in FIGS. 2, 3, and 5) has been reached in step 214 and an affirmative judgment is yielded, the processing moves to step 216, whereupon a course selection L (or R) selected by the player at or beyond the branching point 20 is discriminated and the processing moves to step 218.

When it is judged whether course selection has been decided in step 218, standby takes place until the course selection has been decided and, when decided (affirmative judgment), the processing moves to step 220, whereupon travel historical data corresponding with the course selection is read and the processing moves to step 222.

In step 222, the display of the ghost image 12G in sync with the travel time axis of the vehicle image 12 is executed, whereupon the processing moves to step 224. Further, the processing also moves to step 224 when a negative judgment is yielded in step 214.

When it is judged whether the goal point 18 has been reached in step 224 and a negative judgment is yielded, the routine ends. Further, when an affirmative judgment is yielded in step 224, the processing moves to step 226, the ghost image 12G is erased, and the processing ends.

FIG. 5 shows the flow of the selection of travel historical data based on a planar view of the course with a branching point 20 at the center thereof and shows the vehicular swept path of the vehicle image 12 by means of a chain line. In this case, the vehicle image 12 selects the right-hand course in a planar perspective at the branching point 20.

Here, the ghost car image 12G travels together with the vehicle image 12 and far as the branching point 20 (see the bold arrow in FIG. 5) and, in the course discrimination zone established in the area of the branching point 20, travel historical data corresponding with the course discriminated by the course selection discrimination portion 70 are read from two types of travel historical data prepared beforehand (stored in the travel historical data storage portion 62) and selected for the display of the ghost car image 12G (selected travel historical data). On the other hand, the travel historical data used for the left-hand course in a planar perspective of FIG. 5 are not applied on this occasion (unselected travel historical data).

Thus, travel historical data corresponding with each course are pre-prepared in accordance with the course type of the branch-point transition at the branching point 20, and the course selected by the operator is discriminated in real time in the area of the branching point 20, either set of travel historical data is read, and the travel historical data is made to continue on from the previous travel historical data, whereby the ghost car image 12G is displayed. Therefore, the ghost car image can always be made to travel together with the player moving body in accordance with the course arbitrarily selected by the operator. As a result, the operator is able to compare the travel state of the vehicle image 12 that they are operating with the state of the ghost car image 12G without averting their gaze. Hence, it is possible to concentrate on an operation that includes speed and steering.

Further, when the course layout is simple and the branching point 20 is in one location between the starting point 16 and goal point 18, two ghost car images 12G may usually be displayed between the starting point 16 and goal point 18 in correspondence with each of the two types of courses of the branching point 20 from the starting point 16.

There can also be a function to select and establish the vehicle type and vehicle performance and ghost cars recorded with the same performance and vehicle types can also be made to travel in correspondence with the vehicle type selected by the player and the established performance and so forth. A recording region for recording the characteristics of the vehicle selected by the player is established in the memory. The processing unit checks the memory region and establishes the characteristics of the ghost cars. For example, if a car for which the fastest speed is prioritized is chosen, ghost cars are also displayed with the same vehicle type or a vehicle type for which the same performance has been established (only the exterior is different). That is, ghost car data is recorded for the respective sections of all the courses and classified by vehicle type and function. For example, supposing that the course branches from A into B and C, there are three types of vehicle 1, 2, and 3 and there are three types of performance, namely 'type a (speed prioritized)', 'type b (cornering prioritized)', and 'type c (acceleration prioritized)'. Hence, travel data of eighteen patterns, namely 'vehicle type 1 and performance type a in progressing from A to B'
'vehicle type 1 and performance type b in progressing from A to B'
'vehicle type 1 and performance type c in progressing from A to B'
'vehicle type 2 and performance type a in progressing from A to B'
'vehicle type 2 and performance type b in progressing from A to B'
'vehicle type 2 and performance type c in progressing from A to B'
'vehicle type 3 and performance type a in progressing from A to B'
'vehicle type 3 and performance type b in progressing from A to B'
'vehicle type 3 and performance type c in progressing from A to B'
'vehicle type 1 and performance type a in progressing from A to C'
'vehicle type 1 and performance type b in progressing from A to C'
'vehicle type 1 and performance type c in progressing from A to C'
'vehicle type 2 and performance type a in progressing from A to C'
'vehicle type 2 and performance type b in progressing from A to C'
'vehicle type 2 and performance type c in progressing from A to C'
'vehicle type 3 and performance type a in progressing from A to C'
'vehicle type 3 and performance type b in progressing from A to C'
'vehicle type 3 and performance type c in progressing from A to C', are recorded in correspondence with course A, and two ghost car data are selected from these travel data in accordance with the vehicle type and performance of the player' car. Supposing that the player car is 'vehicle type 2 and performance type c, two ghost cars are selected, namely 'vehicle type 2 and performance type c in progressing from A to B' and 'vehicle type 2 and performance type c in progressing from A to C', and travel at the same time as the player car on course A.

The vehicle type (only the exterior is different) of the ghost car is the same as that of the player car or can conversely have an exterior other than that of the player car (only the vehicle type is changed, the performance and travel data remaining the same as those of the original ghost car). When ghost cars are prepared in accordance with the quantity of forks, if the vehicles are of the same type and have the same color, the color of one ghost car may be changed. When there is a function to select the performance and vehicle type and so forth prior to the start and the player executes a predetermined operation for the next game immediately following 'Game Over', the game can be started by applying the selection made in the previous game as is.

Figure 8A:
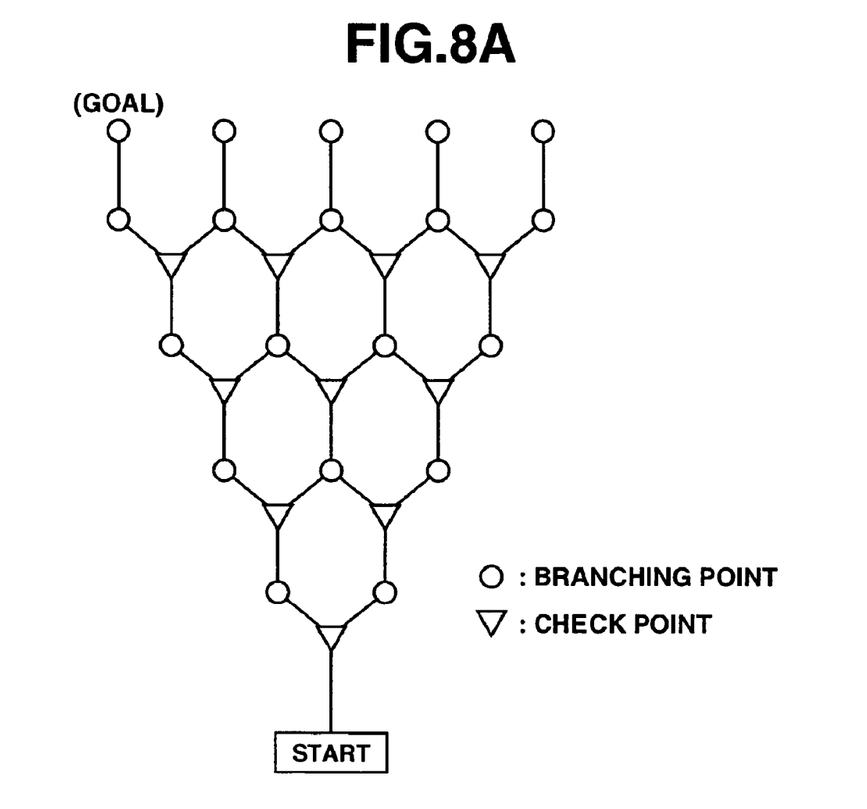
FIGS. 8A and 8B show the branched state of the course.
Figure 8B:
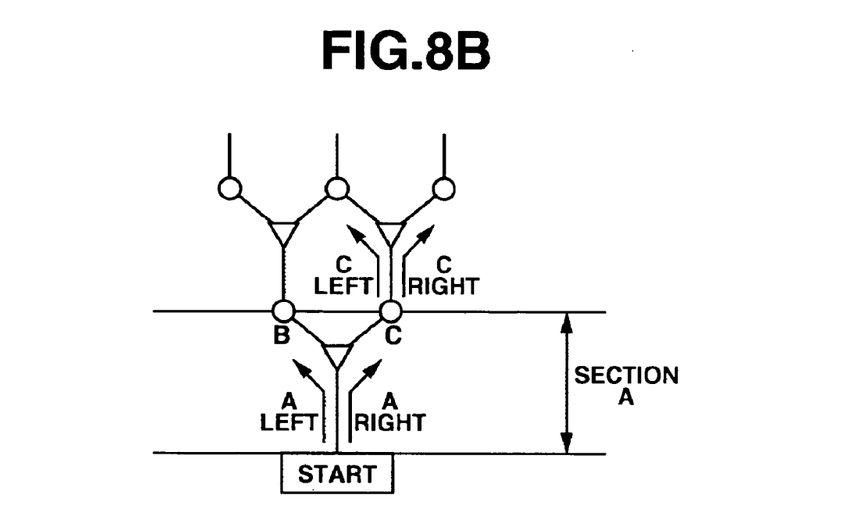

FIGS. 8A and 8B relate to embodiments other than that in FIG. 3, where FIG. 8A schematically shows the branched state of the course, and FIG. 8B is a partial enlarged view. In this embodiment, processing to cause ghost cars to appear in cases where further branching takes place before the fork roads will be described. A total of three ghost cars, namely a player vehicle (player car), an A left ghost car and B left ghost car travel along section A shown in FIG. 8B. At the point where the A left ghost car reaches check point B, the A left ghost car is eliminated. Once the player car has reached check point B, the B left ghost car and B right ghost car are started at the same time. Further, section time between players is calculated by means of the interval between a certain check point and the next check point.

We claim:

1. A game device for providing a game in which a player operates a moving body that races on a course provided in a virtual space, comprising:
   a processing unit configured to execute a program; and
   a memory configured to store the program and historical travel data of the player moving body, the historical travel data being associated with a plurality of fork roads, the plurality of fork roads corresponding to sections of the course starting at branching points, wherein, by executing the program, the processing unit:
   detects next fork roads from the plurality of fork roads, the next fork roads being sections of the course starting at one of the branching points toward which the player moving body is traveling;
   retrieves the historical travel data from the memory in accordance with the next fork roads;
   establishes imaginary moving bodies on two or more of the next fork roads, and a path along the two or more next fork roads on which the imaginary moving bodies travel, based on the historical travel data; and
   causes one of the imaginary moving bodies and the player moving body to travel together on one of the next fork roads that is selected by an operation of the player, wherein the one of the imaginary moving bodies travels together with the player moving body along the path of the one of the next fork roads, based on the historical travel data.

2. The game device of claim 1, wherein:
   a fastest-speed data is selected from the historical travel data, and
   the fastest-speed data is used to establish speeds of the imaginary moving bodies moving on the two or more next fork roads.

3. A computer-implemented method that causes a processing unit to execute a program for a game in which a player operates a moving body that races on a course provided in a virtual space, the course including a plurality of fork roads, the plurality of fork roads corresponding to sections of the source starting at branching points, the method comprising:
   detecting, via the processing unit, next fork roads from the plurality of fork roads, the next fork roads being sections of the course starting at one of the branching points toward which the player moving body is traveling;
   retrieving, via the processing unit, historical travel data of the player moving body from a memory in accordance with the next fork roads, the historical travel data being associated with the plurality of fork roads;
   establishing, via the processing unit, imaginary moving bodies on two or more of the next fork roads, and a path along the two or more next fork roads on which the imaginary moving bodies travel, based on the historical travel data associated with each of the plurality of fork roads; and
   causing, via the processing unit, one of the imaginary moving bodies and the player moving body to travel together on one of the next fork roads that is selected by an operation of the player, wherein the one of the imaginary moving bodies travels together with the player moving body along the path of the one of the next fork roads, based on the historical travel data.

4. The computer-implemented method of claim 3, wherein:

a fastest-speed data is selected from the historical travel data, and the fastest-speed data is used to establish speeds of the imaginary moving bodies moving on the two or more next fork roads.

5. A non-transitory storage medium for storing a program for causing a computer to execute instructions for a method for a game in which a player operates a moving body that races on a course provided in a virtual space, the course including a plurality of fork roads, the plurality of fork roads corresponding to sections of the source starting at branching points, the method comprising:

executing a program that provides the game;

detecting next fork roads from the plurality of fork roads, the next fork roads being sections of the course starting at one of the branching points toward which the player moving body is traveling;

retrieving historical travel data of the player moving body from a memory in accordance with the next fork roads, the historical travel data being associated with the plurality of fork roads;

establishing imaginary moving bodies on two or more of the next fork roads, and a path along the two or more next fork roads on which the imaginary moving bodies travel, based on the historical travel data associated with each of the plurality of fork roads; and causing one of the imaginary moving bodies and the player moving body to travel together on one of the next fork roads that is selected by an operation of the player, wherein the one of the imaginary moving bodies travels together with the player moving body along the path of the one of the next fork roads, based on the historical travel data.

6. The non-transitory storage medium of claim 5, wherein:

a fastest-speed data is selected from the historical travel data, and the fastest-speed data is used to establish speeds of the imaginary moving bodies moving on the two or more next fork roads.

* * * * *